Dec. 5, 1961     W. C. DICKINSON     3,011,303
MENSTRUAL CYCLE INDICATOR

Filed Nov. 20, 1956     2 Sheets-Sheet 1

INVENTOR.
Wilbur C. Dickinson.
BY
William J. Ruano
HIS ATTORNEY.

INVENTOR.
Wilbur C. Dickinson,
BY
HIS ATTORNEY.

United States Patent Office 3,011,303
Patented Dec. 5, 1961

3,011,303
MENSTRUAL CYCLE INDICATOR
Wilbur C. Dickinson, 569 N. Front St., Reading, Pa.
Filed Nov. 20, 1956, Ser. No. 623,424
2 Claims. (Cl. 58—4)

This invention relates to a menstrual cycle indicator, which I prefer to designate by the trademark notation of "Personal Calender" clock, namely a clock that will continuously indicate the various stages of a female menstrual cycle, whereby a woman may visually determine precisely whether she is in the phase wherein conception is likely or unlikely to occur—also to enable her to determine in advance when the menstrual cycle will begin, so that birth control may be effectively practiced, vacations may be properly scheduled, etc.

The common method employed by women to keep records of their menstrual cycles is by marking the pages of a calender. However such method is subject to repetitive error, particularly in view of the fact that the majority of females have no accurate knowledge of the exact duration of the various phases of their particular menstrual cycle.

An object of the present invention is to provide a novel timing mechanism or clock that will overcome the above named disadvantages of conventionally used systems and which will give a continuous and reliable indication of the various phases of a woman's menstrual cycle, which clock may be either a separate unit or may be combined with a conventional electric or spring wound clock or watch to provide the two-fold purpose of indicating time as well as the phases of a menstrual cycle.

Another object of the present invention is to provide a so called "Personal Calender" clock which is adjustable to denote different menstrual cycles for different women, since while the time which elapses from one menstrual period to another is 28 days for most women, it may be shorter or longer for different women, in some cases as short as 21 days and in other instances, as long as 32 days.

A still further object of this invention is to provide a menstrual cycle indicator together with means for hiding the indicator from view until observation is desired, whereby the information may be kept in privacy.

Other objects and advantages of my invention will become apparent from a study of the following description taken with the accompanying drawings wherein.

Figure 1:
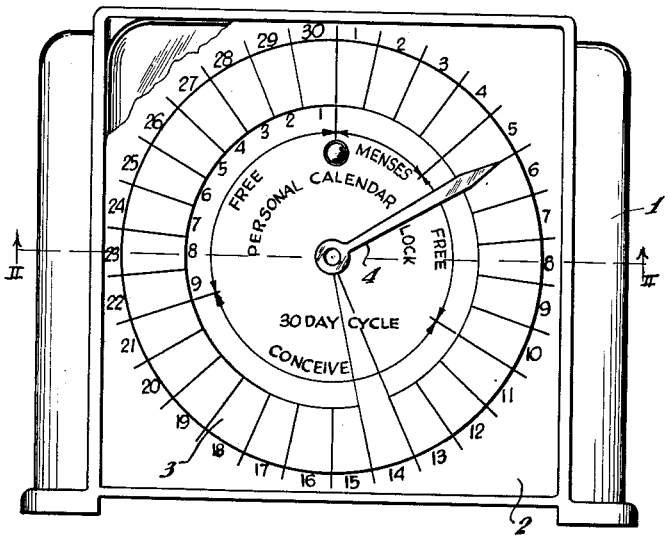
FIG. 1 is a front elevational view of a menstrual cycle indicator in the forms of an electric clock or timing device and embodying the principles of the present invention.
Figure 2:
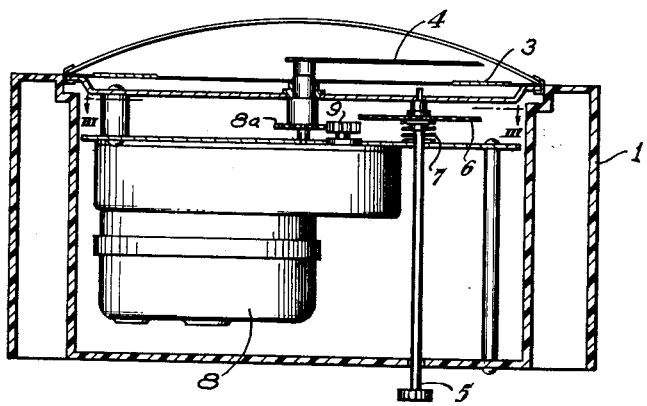
FIG. 2 is a transverse cross-sectional view taken along line II—II of FIG. 1.
Figure 3:
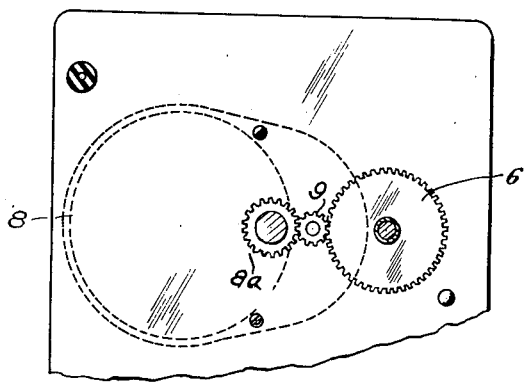
FIG. 3 is a fragmentary cross-sectional view taken along line III—III of FIG. 2.

Referring more particularly to FIGS. 1, 2 and 3 of the drawing, numeral 1, denotes a clock case of plastic, metal or other suitable material, having a face portion 2 on which is inscribed or mounted a dial 3 which is calibrated to denote the phases of a female menstrual cycle for a female having a 30 day cycle. For such 30 day cycle, as indicated by the calibrations, the menses occur for a period of the first four days, denoted by numerals 1 to 4 inclusive. Following this, that is, between the 5th and 10th days after start of the menses there is a "free" phase during which conception does not occur, and following this is a period between the 11th and 21st day labeled "conceive," which is the period or phase during which conception is most likely to occur, particularly on the 14th day (day of ovulation) as represented by the elongated dial marking. Following this there is a second "free" phase between the 22nd and 30th day, during which conception does not occur.

As mentioned before, the above described calibration is appropriate or accurate only for a 30 day menstrual cycle. For other cycles, the phases are slightly different. For example, for a twenty six day cycle the successive number of days for the "menses," "free" "conceive" and second "free" phases are as follows 1–4, 5–6, 7–18 and 19–26. For a twenty seven day cycle, it is 1–4, 5–7, 8–19 and 20–27. For a twenty eight day cycle, which is the average cycle for most women, it is 1–4, 5–8, 9–20 and 21–28, wherein the 14th day is the day of ovulation, that is, the day conception is most likely to occur. For a twenty nine day cycle, the phases are 1–4, 5–9, 10–20 and 21–29, wherein the 14th day is the day of ovulation.

Turning again to FIGS. 1, 2 and 3 which show a dial 3 calibrated for a 30 day menstrual cycle, numeral 4 denotes a pointer which sweeps over the dial to indicate the particular phase of a given woman's menstrual cycle. Assuming a 30 day cycle, pointer 4 should be geared down sufficiently so as to make one complete revolution in every 30 days. Obviously if the dial were calibrated to show other cycles, for example, a 28 day cycle, pointer 4 should make a complete revolution in only 28 days, or the time period for the complete menstrual cycle.

FIG. 2 shows the internal construction of the clock and shows that pointer 4 may be adjustably turned to any desired location on dial 3 by manually turning and adjusting knob 5 which is rigidly secured to a gear 6 which is normally kept out of engagement with the driving gear 9 by means of a spring 7. Thus to turn pointer 4 to the zero position, for example, at the start of the menses, it is first necessary to pull out adjusting knob 5 to compress spring 7 and allow gears 6 and 9 to mesh. Then, knob 5 may be turned until pointer 4 is set on the zero position and then released.

An electric clock motor 8 is provided, preferably one with a low output speed, such as one revolution each 10 days or 240 hours as provided by a Haydon Synchronous Timing Motor, Series 4400 having a 10 tooth drive gear. Motor 8 drives a 48 pitch, change gear 8a having 20 teeth for 20 days per revolution, or 28 teeth for 28 days per revolution, or other number of teeth corresponding to the number of days in the menstrual cycle. The distance between the centers of gears 9 and 8a will therefore vary for each change gear.

Actually any clock motor 8 and gear train conventionally used for driving electric clocks may be used to simultaneously drive the menstrual cycle pointer 4 by the mere addition of a suitable gear reduction train, for example by the use of a single 10 tooth gear on the hour hand spindle, along with two compound gear reductions of 12/50 and 10/48, and a single change gear having the same number of teeth as the number of days in the cycle, for obtaining a speed of rotation of pointer 4 which corresponds exactly to the number of days of the menstrual cycle. Moreover, gear changing devices of well known and conventional construction may be incorporated in the gear reduction system to enable adjustment of the speed of rotation of pointer 4 so that it may be varied so as to require between 21 and 32 days for a complete revolution.

Instead of inserting the various names of the different phases of the menstrual cycle, as shown in FIG. 1, the various phases may be differently colored instead to distinguish them. For example, the substantially block shaped segments designated by numbers 1 to 4, may be colored red to indicate the "menses" phase and blocks 5 to 10, inclusive, colored green to indicate the first "free" period, and blocks 11 to 21 inclusive colored orange to indicate the "conception" period, and blocks 22 to 30 also painted green to indicate another "free" period. Of course, other color combinations or distinguishing designations may be used instead and their meaning fully explained in accompanying instruction data.

While the construction shown in FIGS. 1 and 2 illustrates solely a menstrual cycle indicator, for the sake of simplicity, it should be noted that instead of making the unit serve only this purpose, it is preferable to incorporate it into a regular electric clock to also indicate the time of the day.

Figure 4:
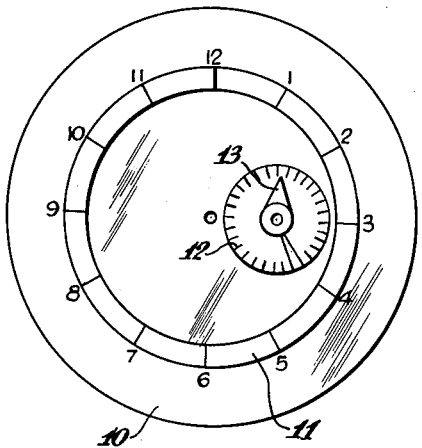
FIG. 4 is a front view of the face of an ordinary electric clock having, in addition thereto, a menstrual cycle indicator in the form of an eccentric small dial face and pointer.

FIG. 4 shows a combined menstrual cycle and time indicating clock having a face 10 of an electric clock (not shown). A menstrual cycle dial 12 calibrated to indicate a 28 day, or other cycle, cooperates with a pointer 13. Either the dial or the pointer may remain stationary while the other rotates relative thereto. Thus the time of day and the particular portion of the menstrual cycle for any particular moment may be visually observed simultaneously.

Figure 5:
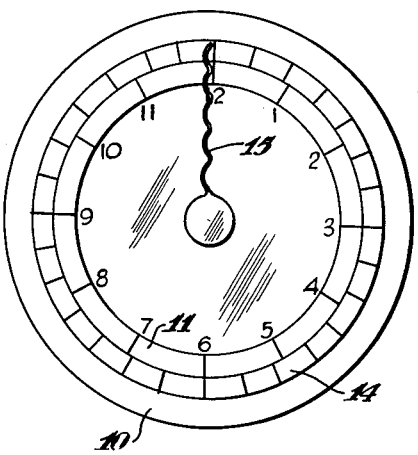
FIG. 5 is a front view of an ordinary electric clock equipped with a modified form of menstrual cycle indicator arranged concentrically and externally of the clock calibrations.

FIG. 5 shows a clock face 10 having a dial 11 which cooperates with the hour and minute hands (not shown) of a clock. Outside the hour dial 11 is a menstrual cycle dial 14 calibrated in 27, 28, 29 etc. units, depending upon the duration of the menstrual cycle of the particular female user. Dial 14 cooperates with a pointer 15 which is driven one revolution during each 28 days, or other number of days representing the duration of the menstrual cycle.

Figure 6:
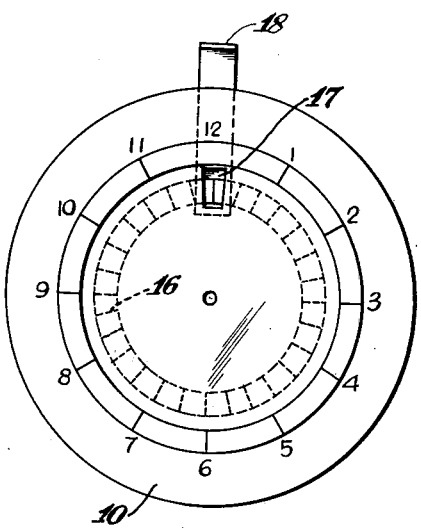
FIG. 6 is a front view of the face of an electric clock which is provided with a concealed menstrual cycle indicator including calibrations which are surrounded by those of the clock and which include means for selectively rendering a portion of such indicator visible.

FIG. 6 shows a further modification of a clock dial face 10 having located therebehind a rotatable menstrual cycle indicating dial 16. A window opening 17 is provided in the clock face which may be either covered or uncovered by radially sliding a thumb piece 18 which has a registering opening therein. Thus, when the thumb piece is pushed all the way in, it will cover window 17 from view, and when a woman wishes to observe the menstrual cycle indicator she pulls out thumb piece 18 until the holes are in registry, whereby the divisions representing the current menstrual cycle phase will be in view. Thus, by noting the color of such divisions she will know the current phase of her menstrual cycle. The menstrual phase indicating dial may be made from a transparent or translucent material, such as plastics, having different colored portions indicative of the four main and recognized phases, and a pilot light may be provided to cause the particular phase in process to be illuminated in color through the viewing aperture.

Figure 7:
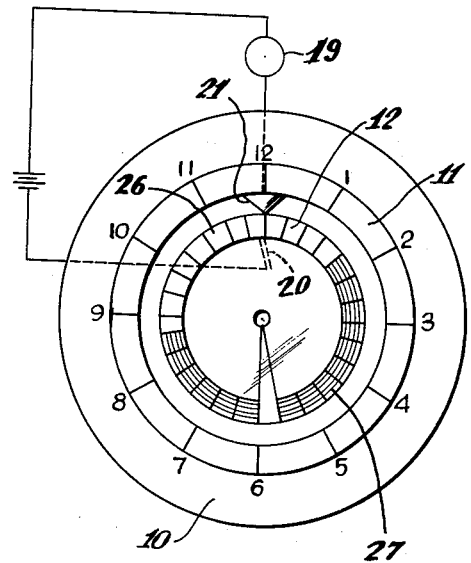
FIG. 7 is a front view of a still further modification in which a menstrual cycle indicator dial is rotatable concentrically within the clock dial and cooperates with a stationary pointer.

FIG. 7 shows a still further modification of the face of a combined clock and menstrual cycle indicator wherein the face has a clock dial 11 and menstrual cycle indicating dial 12 which rotates and cooperates with a stationary pointer 21 to indicate the phases of the menstrual cycle. Of course the dial 12 could be the stationary element and pointer 21 the circularly rotating element instead.

As a further modification, pointer 21 may, in FIG. 7, constitute an electrical contact and any particular phase of the menstrual cycle, such as the conception phase may be represented by an electrical contact segment 26, while other segments 27 are electrically insulating, and a neon light 19 may have its energizing circuit closed through a conventional brush (forming no part of the present invention) only during the "conception" phase, whereby a woman, by noting that the lamp is on will know that her "conception" period is current. Or perhaps the lamp could light only during the "free" periods, in which event the corresponding segments of the dial constitute electrical contacts.

Figure 8:
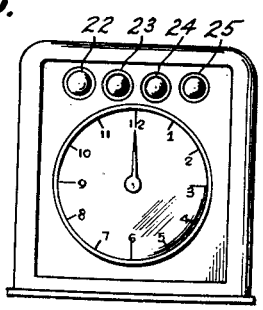
FIG. 8 is a front view of an electric clock showing different colored pilot lights for denoting different menstrual phases.

Another modification, as shown in FIG. 8 is to provide a plurality of separate electrical contacts on the slowly rotating dial, to cause different colored pilot lights or apertures 22, 23, 24 and 25 to be illuminated in turn, to represent each of the four individual phases. For example, red light 22 may represent the phase of menses, green light 23 the first phase of "free" time, yellow light 24, the phase of conceiving and again green light 25, the second phase of "free" time. Lights 22 to 25 may be put in other positions on any part of the clock, for instance, one in each corner of the face. Thus, a woman may view the different colored lights even while in bed at night and know at which menstrual phase she is in.

Among many possibilities of pattern arrangement of such multiple lights, the described two patterns will be found suggestive so as to provide easy interpretation of the exact phase in process.

Of course, such colored pilot lights may be used as the only visual indication to be provided, or they may be combined with numbered-colored and or lettered dials, intended to represent menstrual cycle phases. Also, the uninterrupted glow of one or another colored light, will serve the useful purpose of showing that the clock mechanism is in actual working order.

While, as described above, it is preferable to have one complete revolution of the pointer or dial of the menstrual cycle indicator for the exact number of days of a menstrual cycle for a particular woman, generally, a 28 day cycle, it may instead rotate once every 30 day (or 31) day cycle since this is usually the longest cycle. Then at the beginning of each menstrual phase the pointer is reset or adjusted to zero. Thus, the 30 (or 31) dial may be used by women having cycles of a lesser number of days. In operation, a woman having a 29 day cycle will move the pointer 28 to zero each month at the start of the menses phase.

While the above invention has been described as being applicable to electric clocks, it is equally applicable to spring-wound clocks, and those powered by other sources of power—also to watches, such as wrist watches, lapel watches etc.

Thus it will be seen that I have provided an efficient menstrual cycle indicator which will indicate precisely the various phases of the female menstrual cycle as well as to enable adjustments for cycles to compensate for varying lengths of such cycle for different females and which enables a woman to properly schedule vacations and the like, in advance, and to give her current information as to the likelihood of conception at any time; furthermore I have incorporated a menstrual cycle indicator with an electric clock, or other type of clock or watch, in a manner so that the indicator may be partly concealed, or made relatively inconspicuous as compared to the clock to provide a certain degree of privacy.

While I have illustrated and described several specific embodiments of my invention, it will be understood that these are by way of illustration only, and that various changes and modifications may be made within the contemplation of my invention and within the scope of the following claims.

I claim:

1. In combination with an electric clock, a menstrual cycle indicator driven thereby which operates in a substantially 28 day cycle denoting the menses, conception, and free-of-conception phases, and electric illuminating means electrically controlled by said indicator so that it will become illuminated during one of said phases during each menstrual cycle, whereby a visual indication is given during the existence of such phase.

2. An electrical menstrual clock having an hour indicating dial face and hand, means geared to said hand so as to rotate once in 28 days, said means including electrical contact means rotatable therewith, stationary electrical contact means engageable with said rotatable contact means only for the portion of said 28 day period representative of that during which conception is likely, and a lamp in circuit relationship with said rotatable and stationary electrical contact means and which is illuminated only during said conception period.

References Cited in the file of this patent

UNITED STATES PATENTS

| | | |
|---|---|---|
| Re. 23,261 | Parissi | Aug. 22, 1950 |
| 508,467 | Clark | Nov. 4, 1893 |

FOREIGN PATENTS

| | | |
|---|---|---|
| 1,038,844 | France | May 13, 1953 |
| 309,811 | Switzerland | Nov. 16, 1955 |
| 313,609 | Switzerland | June 15, 1956 |

OTHER REFERENCES

Popular Science, page 152, July 1949.